(12) United States Patent
Peng et al.

(10) Patent No.: US 11,201,784 B2
(45) Date of Patent: Dec. 14, 2021

(54) ARTIFICIAL INTELLIGENCE-BASED NETWORKING METHOD AND DEVICE FOR FOG RADIO ACCESS NETWORKS

(71) Applicant: BEIJING UNIVERSITY OF POSTS AND TELECOMMUNICATIONS, Beijing (CN)

(72) Inventors: Mugen Peng, Beijing (CN); Hongyu Xiang, Beijing (CN); Shi Yan, Beijing (CN)

(73) Assignee: BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 0 days.

(21) Appl. No.: 16/718,457

(22) Filed: Dec. 18, 2019

(65) Prior Publication Data
US 2020/0195506 A1  Jun. 18, 2020

(30) Foreign Application Priority Data
Dec. 18, 2018 (CN) .......................... 201811548655.7

(51) Int. Cl.
*H04L 12/24* (2006.01)
*H04W 24/10* (2009.01)
(Continued)

(52) U.S. Cl.
CPC ...... *H04L 41/0836* (2013.01); *H04L 41/0816* (2013.01); *H04L 41/16* (2013.01);
(Continued)

(58) Field of Classification Search
CPC .......................... H04L 41/0836; H04L 41/16
See application file for complete search history.

(56) References Cited

U.S. PATENT DOCUMENTS

| 10,122,604 B2 | 11/2018 | Byers et al. |
| 2016/0278061 A1 | 9/2016 | Peng |

(Continued)

FOREIGN PATENT DOCUMENTS

| CN | 104796918 | 7/2015 |
| CN | 106792888 | 5/2017 |

(Continued)

OTHER PUBLICATIONS

Zhang, "Relationship awareness and resource allocation in fog computing based radio access networks", Information and Science, Oct. 31, 2018, Beijing, China, pp. 1-7. English Abstract attached.
(Continued)

*Primary Examiner* — Esther B. Henderson
(74) *Attorney, Agent, or Firm* — Grossman, Tucker, Perrault & Pfleger, PLLC

(57) ABSTRACT

An artificial intelligence-based networking method for fog radio access networks, which includes: a central computing logic module receives reported data which includes measurement report data from user terminals, wireless transmission data from base stations, and operation and maintenance data from a radio access network. Based on these reported data and proper machine learning algorithms, the central computing logic module configures an operating mode of a radio access network that matches user behavior, service attributes, and radio access network performance indicators. According to the operating mode, an edge computing logic module determines whether to optimize a current configuration of an edge communication entity and allocation of radio resources, computing resources, and caching resources. With proper machine learning algorithms, the proposed networking method meets various service requirements. By configuring the radio access network flexibly, the
(Continued)

method enables the radio access network to adapt to different application scenarios and performance objectives.

11 Claims, 7 Drawing Sheets

(51) Int. Cl.
*H04W 40/24* (2009.01)
*G06N 20/00* (2019.01)

(52) U.S. Cl.
CPC ........... *H04W 24/10* (2013.01); *H04W 40/24* (2013.01); *G06N 20/00* (2019.01)

(56) References Cited

U.S. PATENT DOCUMENTS

| | | |
|---|---|---|
| 2017/0272365 A1 | 9/2017 | Wei et al. |
| 2018/0019910 A1* | 1/2018 | Tsagkaris ............ H04L 43/0817 |
| 2018/0020062 A1 | 1/2018 | Li |

FOREIGN PATENT DOCUMENTS

| | | |
|---|---|---|
| CN | 106954267 | 7/2017 |
| CN | 107222843 | 9/2017 |

OTHER PUBLICATIONS

Office Action from corresponding Chinese Appln. No. 201811548655.7, dated Feb. 26, 2020. English translation of concise explanation of relevancy.

\* cited by examiner

ARTIFICIAL INTELLIGENCE-BASED NETWORKING METHOD AND DEVICE FOR FOG RADIO ACCESS NETWORKS

FIELD

The present disclosure relates to wireless communication technologies, and in particular, to an artificial intelligence-based networking method and device for fog radio access networks.

BACKGROUND

The fog radio access network (F-RAN) can alleviate the burden on the fronthaul and/or backhaul links in radio access networks. Specially, there are user terminals and edge communication entities in F-RANs to be exploited. The user terminal is also referred to as user equipment (UE). Through the computing and caching capabilities of the user terminals and the edge communication entities, local services are available and the burden on the fronthaul and/or backhaul links are alleviated, which further improves the spectral and energy efficiency of the radio access networks.

For the existing networking method for F-RANs, the main implementation steps are as follows:

First, by comparing the values of various information parameters with preset thresholds, a communication mode for a user terminal is selected. The communication mode for example, is a network access mode. Next, based on the communication mode, a corresponding edge communication entity is determined to be connected with the user terminal. Finally, the determined edge communication entities are networked as an F-RAN. The edge communication entity may be a small base station, a macro base station, a remote radio head (RRH), or a fog-access point (F-AP). The information parameters may include the location, moving speed, quality of service requirements, computing and caching capabilities, and so on. The preset thresholds of the information parameters may be manually configured according to needs.

However, with the scale of the F-RAN and service demands increase, the amount of manual participation in networking is increasing, which incurs an increase in the labor costs.

SUMMARY

The present disclosure proposes an artificial intelligence-based networking method and device for F-RANs.

The present disclosure provides an artificial intelligence-based networking method for fog radio access networks, including: receiving, by a central computing logic module, reported data which includes: measurement report data from user terminals, wireless transmission data from base stations, and operation and maintenance data from a radio access network. The measurement report data relates to user behavior, the wireless transmission data relates to performance indicators of the radio access network, and the operation and maintenance data relates to service attributes.

Based on the reported data obtained during a cycle T1 and a proper machine learning algorithm, the central computing logic module configures an operating mode of the radio access network that matches the user behavior, the service attributes, and the performance indicators of the radio access network.

The edge computing logic module receives information of the operating mode information of the radio access network from the central computing logic module. According to the operating mode of the radio access network, the edge computing logic module, during a cycle T2, determines whether a current configuration of an edge communication entity meets a networking aim. The cycle T2 is shorter than the cycle T1.

If the current configuration of the edge communication entity meets the networking aim, the edge computing logic module allocates resources to the user terminals connected to the edge communication entity. The edge communication entity and the user terminals that are allocated with the resources are networked as an F-RAN. The resources include radio resources, computing resources, and caching resources.

Moreover, the machine learning algorithm may be a representation learning algorithm which includes:

obtaining a dimension-reduced data from the reported data through data feature classification; and analyzing latent factors existing in the dimension-reduced data and constructing a valid representation, and outputting the operating mode of the radio access network that matches the user behavior, the service attributes, and the performance indicators of the radio access network.

Further, in a case that the operating mode of the radio access network is a wide-area seamless coverage mode, macro base stations with high transmission power are implemented. A user terminal selects a serving macro base station according to a strongest received power. The macro base stations are configured with completed protocol stack functions. Methods like multi-input multi-output (MIMO) and advanced multiple access are also configured.

In a case that the operating mode of the radio access network is a hotspot high capacity mode, a small base station is used to connect user terminals at a hotspot to the radio access network. If interference of the small base station is higher than a preset threshold θ1 or an average capacity of user terminal at the hotspot is higher than a preset threshold θ2, the small base station is transformed to an RRH. Other functions of the small base station including functions on a physical layer, a media access control (MAC) layer, and a radio resource control (RRC) layer are moved to a base station unit (BBU) pool. The centralized BBU pool is connected to the RRH through the fronthaul link.

In a case that the operating mode of the radio access network is a massive-connection low power mode, a clustering mechanism is adopted. In the clustering mechanism, adjacent user terminals are formed into a mesh or tree-like topology cluster. Packet traffic generated by cluster members is delivered to a selected cluster head through device-to-device or multi-hop relay. The cluster head would directly access the radio access network. The cluster head is a user terminal, of which a number of connected user terminals is more than a preset threshold θ3, and the cluster members are user terminals in the cluster except the cluster head.

In a case that the operating mode of the radio access network is a low-latency high-reliability mode, an F-AP, of which a transmission delay is less than a preset threshold θ4 is utilized to enable user terminals to be connected to the radio access network with a multiple access method.

If a transmission delay between the F-AP and a target user terminal is greater than a preset threshold θ4, while a transmission delay between the target user terminal and its neighbor user terminal is less than the preset threshold θ4, the target user terminal accesses the neighbor user terminal with a device-to-device communication method.

Further, the method further includes: monitoring, by the central computing logic module, the measurement report data from all the user terminals in the radio access networks, and checking whether an obtained quality of service and a number of active user terminals exceed respective preset thresholds. If not, a duration of the cycle T1 is extended; otherwise the duration of the cycle T1 is shortened.

Further, according to the operating mode of the radio access network, the edge computing logic module determines whether the configured edge communication entity meets the networking aim, which includes:

during the cycle T2, monitoring, by the edge computing logic module, performance of the edge communication entity and checking whether a variation of a target performance indicator exceeds a preset threshold;

if exceeds, determining that the current configuration of the edge communication entity does not meet the networking aim. Then there is a need for the edge computing logic module to optimize the current configuration of the edge communication entity. Specially:

In the case that the operating mode of the radio access network is the wide-area seamless coverage mode, the edge computing logic module utilizes a deep reinforcement learning algorithm DRL1 to optimize the edge communication entity, where transmission power and a handover parameter of the macro base stations are optimized.

In the case that the operating mode of the radio access network is the hotspot high capacity mode, the edge computing logic module utilizes a deep reinforcement learning algorithm DRL2 to optimize the edge communication entity, where a number of activated small base stations or RRHs and update of cached content are optimized.

In the case that the operating mode of the radio access network is the massive-connection low power mode, the edge computing logic module utilizes a decision tree algorithm and a machine learning algorithm to optimize the edge communication entity, where a decision tree model is trained to select the cluster head and the machine learning algorithm is utilized to optimize routing from the cluster members to the cluster head.

In the case that the operating mode of the radio access network is the low-latency high-reliability mode, the edge computing logic module utilizes a deep Bayesian learning algorithm to optimize the edge communication entity. According to historical information on an access node of a user terminal, a future access node selection of the user terminal is predicted, and mobility-related parameters of the access node are optimized.

The edge computing logic module checks whether the optimized edge communication entity meets the networking aim. If meets, the edge computing logic module allocates the resources to the user terminals connected to the edge communication entity. The edge communication entity and the user terminals that are allocated with the resources are networked as an F-RAN. Otherwise, there is a need to re-configure the operating mode to achieve the networking aim.

Further, according to the operating mode of the radio access network, the edge computing logic module, during the cycle T2, determines whether current configuration of the edge communication entity meets the networking aim, which further includes:

if current resources allocated by the edge communication entity do not meet the networking aim, optimizing, by the edge computing logic module, allocation of the current resources to the configured edge communication entity during a cycle T3, where the cycle T3 is shorter than the cycle T2.

Further, the edge computing logic module optimizes the allocation of the current resources during the cycle T3, including:

in the case that the operating mode of the radio access network is the wide-area seamless coverage mode, allocating, by the edge computing logic module, during the cycle T3, the radio resources by using a deep reinforcement learning algorithm DRL3. A reward function of the DRL3 is coverage of an access node, and a state of the DRL3 is interference distribution and a link status;

in the case that the operating mode of the radio access network is the hotspot high capacity mode, allocating, by the edge computing logic module during the cycle T3, the radio resources and the caching resources by using by using a deep reinforcement learning algorithm DRL4. A reward function of the DRL4 is a weighted sum on an average throughput of the user terminals and an average capacity of the access nodes, and a state of the DRL4 is the interference distribution and a cache status;

in the case that the operating mode of the radio access network is the massive-connection low power mode, allocating, by the edge computing logic module during the cycle T3, the radio resources and the computing resources by using a deep reinforcement learning algorithm DRL5. A reward function of the DRL5 is a number of activated access nodes, and a state of the DRL5 is the interference distribution and available computing resources; and in a case that the operating mode of the radio access network is the low-latency high-reliability mode, allocating, by the edge computing logic module during the cycle T3, the radio resources and the caching resources by using a deep reinforcement learning algorithm DRL6. A reward function of the DRL6 is a weighted sum on an average delay and a delay jitter duration, and a state of the DRL6 is the interference distribution and a cache state.

The edge computing logic module checks whether optimized resource allocation meets the networking aim. If meets, the edge communication entity and user terminals that are allocated with proper resources are networked as an F-RAN. Otherwise, there is a need to re-optimize the configuration of the edge communication entity.

The present disclosure further provides an artificial intelligence-based networking device for F-RANs, including: a central computing logic module to receive reported data which includes: the measurement report data from user terminals, wireless transmission data from base stations, and operation and maintenance data from a radio access network. The measurement report data relates to user behavior, the wireless transmission data relates to performance indicators of the radio access network, and the operation and maintenance data relates to service attributes.

Based on the reported data obtained during a cycle T1 and a proper machine learning algorithms, the central computing logic module configures an operating mode of the radio access network that matches the user behavior, the service attributes, and the performance indicators of the radio access network.

The edge computing logic module receives information of the operating mode of the radio access network from the central computing logic module. According to the operating mode of the radio access network, the edge computing logic module, during a cycle T2, determines whether a current configuration of an edge communication entity corresponding to the edge computing logic module meets a networking aim. The cycle T2 is shorter than the cycle T1.

If the current configuration meets the networking aim, the edge computing logic module allocates resources to the user terminals connected to the edge communication entity. The edge communication entity and the user terminals that are allocated with the resources are networked as an F-RAN. The resources include radio resources, computing resources, and caching resources.

Further, during the cycle T2, the edge computing logic module monitors performance of the edge communication entity and checks whether a variation of a performance indicator exceeds a preset threshold.

According to the operating mode of the radio access network, the edge computing logic module determines whether the configured edge communication entity meets the networking aim. If the current configuration of the edge communication entity does not meet the networking aim, then there is a need for the edge computing logic module to optimize the current configuration of the edge communication entity.

According to the artificial intelligence-based networking method and device provided by the present disclosure, the central computing logic module receives the reported data; based on these reported data and proper machine learning algorithms, the central computing logic module configures the operating mode of the radio access network that matches user behavior, service attributes, and performance indicators of the radio access network; according to the operating mode, the edge computing logic module determines whether the configured edge communication entity meets the networking aim. If the current configuration meets the networking aim, the edge computing logic module allocates the resources to the user terminals connected to the edge communication entity. The edge communication entity and the user terminals that are allocated with proper resources are networked as an F-RAN. The resources include radio resources, computing resources, and caching resources.

Embodiments of the present disclosure further disclose a non-transitory computer readable storage medium, storing a computer program which, when executed by a processor, causes the processor to perform the following steps:

receiving reported data which includes: measurement report data from user terminals, wireless transmission data from base stations, and operation and maintenance data from a radio access network, in which the measurement report data relates to user behavior, the wireless transmission data relates to performance indicators of the radio access network, and the operation and maintenance data relates to service attributes;

configuring, based on the reported data obtained during a cycle T1 and a proper machine learning algorithm, an operating mode of the radio access network that matches the user behavior, the service attributes, and the performance indicators of the radio access network.

receiving information of the operating mode of the radio access network, and determining, according to the operating mode of the radio access network, during a cycle T2, whether a current configuration of an edge communication entity meets a networking aim, in which the cycle T2 is shorter than the cycle T1; and if the current configuration of the edge communication entity meets the networking aim, allocating resources to the user terminals connected to the edge communication entity, to network the edge communication entity and the user terminals that are allocated with the resources as an F-RAN, in which the resources comprise radio resources, computing resources, and caching resources.

Compared with existing techniques, the present disclosure achieves fog radio access networking automatically based on the machine learning algorithms With information perceived actively, the radio access networks adapt to various services. Compared with existing techniques, manual intervention is not required, and labor costs are reduced; it is not necessary to configure preset thresholds for various information parameters, which makes the adaptability and flexibility better and higher. Moreover, since no manual work is required and the information parameters are configured automatically, the impacts of hysteresis or delay become negligible.

Of course, implementing any of the devices or methods of the present disclosure does not necessarily require all of the advantages described above to be achieved at the same time.

BRIEF DESCRIPTION OF THE DRAWINGS

In order to more clearly illustrate the embodiments of the present disclosure or the technical solutions in the existing techniques, the drawings used in the embodiments or the description of the existing techniques will be briefly described below. The drawings in the following description are only examples. For those skilled in the related art, other drawings may be obtained according to these drawings without any creative work.

DETAILED DESCRIPTION

The technical solutions in the embodiments of the present disclosure are described in the following with reference to the drawings. It is apparent that the described embodiments are only a part of the embodiments of the present disclosure, but not all embodiments. All other embodiments obtained by those skilled in the related art based on the embodiments of the present disclosure without creative efforts are falling within the scope of the present disclosure.

The present disclosure proposes an artificial intelligence-based networking method and device for F-RANs to solve the challenges in existing techniques. Compared with existing techniques, the present disclosure achieves fog radio access networking automatically based on the machine learning algorithms With information perceived actively, the radio access networks adapt to various services. Compared with existing techniques, manual intervention is not required, and labor costs are reduced; it is not necessary to configure preset thresholds for various information parameters, which makes the adaptability and flexibility better and higher. Moreover, since no manual work is required and the information parameters are configured automatically, the impacts of hysteresis or delay become negligible.

The artificial intelligence-based networking method provided by the embodiments of the present disclosure is first introduced.

Figure 1:
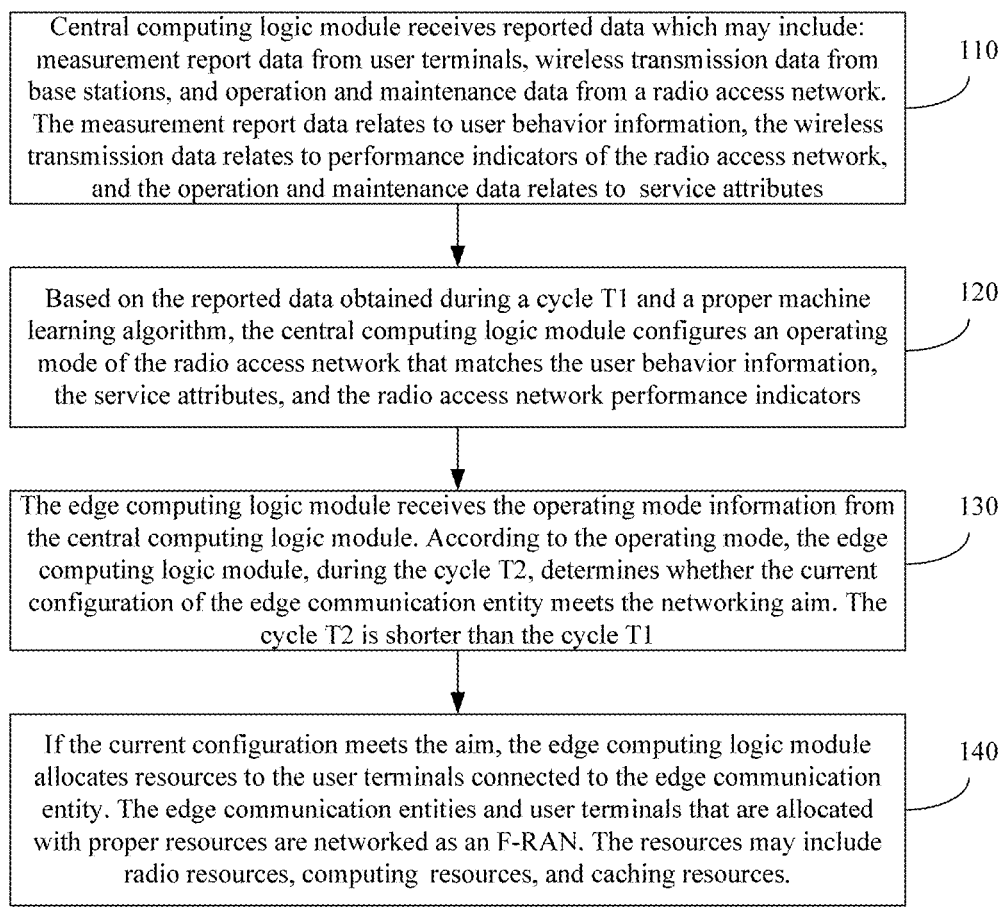
FIG. 1 is a flow chart of an artificial intelligence-based networking method for F-RANs according to embodiments of the present disclosure.

As shown in FIG. 1, FIG. 1 is a flow chart of an artificial intelligence-based networking method for F-RANs, which may include the following steps:

Step 110: a central computing logic module receives reported data which may include: measurement report data from user terminals, wireless transmission data from base stations, and operation and maintenance data from a radio access network. The measurement report data relates to user behavior information, the wireless transmission data relates to performance indicators of the radio access network, and the operation and maintenance data relates to service attributes.

The central computing logic module is located in a centralized cloud or core network. With adequate computing resources available, the central computing logic module can bear machine learning algorithms, resources cost by which are relatively vast for an edge computing logic module of an edge communication entity. With the input of different information, the central computing logic module is responsible for the flexible reconfiguration of the radio access network according to different operating modes. The flexible reconfiguration means that the radio access network is virtualized and customized based on network function virtualization, and network functions are re-arranged and managed on-demand.

The machine learning algorithms may include, but are not limited to, deep reinforcement learning algorithms. The embodiments of the present disclosure are described by taking a deep reinforcement learning algorithm as an example. The machine learning algorithms may include representation learning and deep reinforcement learning algorithms, but are not limited thereto, and other machine learning algorithms like multi-task learning algorithms, migration learning algorithms, and deep unsupervised learning algorithms may also be adopted. Specific deep reinforcement learning algorithms may be selected according to networking requirements and available data.

Since the machine learning algorithms are used, learning can be performed, so the networking performance is improved and the algorithm complexity is reduced.

The measurement report data from the user terminals may include, but is not limited to, receiving signal power at the user terminals and moving rates of the user terminals. The wireless transmission data may include, but is not limited to, key performance indicators (KPIs) of the radio access network, which may include, but are not limited to, the interference distribution, the coverage, the radio link status, the number of activated access nodes, the average delay and delay jitter duration, and the throughput per unit area of the radio access network, and the average transmission capacity of users. The operation and maintenance data from the radio access network may include, but is not limited to, service attributes, user mobility and social relationship attributes, service and user relationship attributes, and other historical data stored in the core network and related to the user terminals and the radio access network. For example, the operation and maintenance data may specify a service attribute such as a service type used by a user terminal in the past, a social relationship attribute such as a communication frequency between user terminals, and a service and user relationship attribute such as a user service preference.

The measurement report data from the user terminals, the wireless transmission data from the base stations, and the operation and maintenance data from the radio access network are used as input data for the central computing logic module to learn. When the user behavior and the service type are used as one of the reference basis for determining whether the networking aim is achieved, the networking method of embodiments of the present disclosure satisfies the user experience and the service feature requirement.

Before the step 110, the method may further include: completing configuration of the central computing logic module and an edge computing logic module, according to service attributes, networking performance requirements, interference suppression requirements, user mobility and social relationship attributes, and the current radio access network status. The above computing logic modules are used for implementing the deep reinforcement learning algorithms to carry out tasks including model training, prediction, and so on.

Step 120: Based on the reported data obtained during a cycle T1 and a proper machine learning algorithm, the central computing logic module configures an operating mode of the radio access network that matches the user behavior information, the service attributes, and the radio access network performance indicators.

The cycle T1 may be set according to user requirements or industrial requirements. It may also be dynamically set according to actual network conditions and actual service requirements. Illustratively, the artificial intelligence-based networking method of the present disclosure may further include:

Step 1, the central computing logic module monitors the measurement report data from all the user terminals in the radio access network, and checks whether the obtained quality of service and the number of active user terminals exceed respective preset thresholds. The number of active user terminals may be reflected by the number of requests from the use terminals. The measurement report data is collected in a preset time period, and the preset time period may be determined based on the user demand and may be equal to (or less than) the duration of the cycle T1.

Step 21, if they do not exceed, the duration of the cycle T1 is extended.

The preset thresholds may be fluctuation ranges adapted to the actual situation, obtained by using a deep reinforcement learning algorithms. If the obtained quality of service and the number of active user terminals do not exceed the preset thresholds, it is indicated that the network fluctuation is not obvious, the radio access network state is stable during the preset time period, the service demands do not change much, and the quality of service and the number of requests from user terminals are satisfied. Hence, the cycle T1 for the operating mode selection by the central computing logic module may be appropriately extended, which further reduces the frequency of operating mode selection and avoid a resource waste.

Step 22, otherwise, the duration of the cycle T1 is shortened.

If the obtained quality of service and the number of active user terminals do exceed the preset thresholds, it is indicated that the network fluctuation is obvious, and the radio access network state is un-stable during the preset time period. The artificial intelligence-based networking method could not guarantee the quality of service and support the number of requests from user terminals during the current preset time period. Hence, the cycle T1 for the operating mode selection by the central computing logic module should be shortened. With a more frequent operating mode selection, a more proper operating mode could be selected to meet the real-time requirements of different services and improve network performance.

Figure 2:
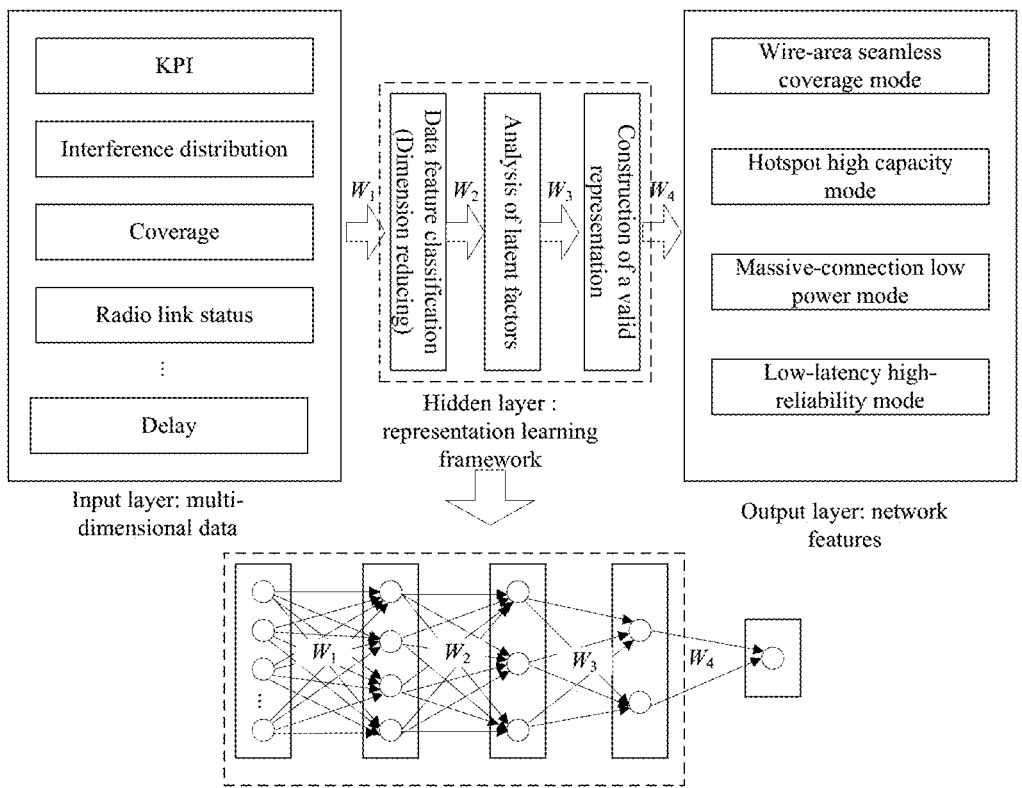
FIG. 2 is an illustration of selecting an operating mode for a radio access network based on representation learning by a central computing logic module according to embodiments of the present disclosure.

As shown in FIG. 2, in order to obtain an operating mode of the radio access network that matches the user behavior information, the service attributes, and the performance indicators of the radio access network, the representation learning method is adopted, which includes:

Step 1, obtaining dimension-reduced data from the reported data through data feature classification; Step 2, analyzing latent factors existing in the dimension-reduced data and constructing a valid representation, and outputting the operating mode of the radio access network that matches the user behavior, the service attributes, and the performance indicators of the radio access network.

The operating mode may include one of the following, but is not limited to: a wide-area seamless coverage mode, a hotspot high capacity mode, a massive-connection low power mode, and a low-latency high-reliability mode. Specifically, (1) In a case that the operating mode is the wide-area seamless coverage mode, macro base stations with high transmission power are implemented. A user terminal may select a serving macro base station according to the strongest received power. The macro base stations are configured with completed protocol stack functions. Techniques such as multi-input multi-output (MIMO) and advanced multiple access methods may also be configured for the macro base stations to improve the cell capacity and coverage. An example of macro base station may be a 4G base station.

(2) In a case that the operating mode is the hotspot high capacity mode, small base stations are used to connect user terminals at a hotspot to the radio access network. If interference of the small base stations is higher than a preset threshold $\theta 1$ or an average capacity of user terminal at the hotspot is higher than a preset threshold $\theta 2$, the small base stations are transformed to RRHs. Other functions of the small base stations including those on the physical layer, the media access control (MAC) layer, and the radio resource control (RRC) layer are moved to a base station unit (BBU) pool. The centralized BBU pool is connected to the RRHs through the fronthaul links. Usually, there may be multiple small base stations to provide a high capacity for the user terminals at the hotspot, and if there is too much interference between the small base stations or the average capacity of user terminal does not meet the requirement, the multiple small base stations will be virtualized into RRHs and connected to a same BBU. The average capacity of user terminal is obtained by the total capacity of the hotspot area dividing the number of user terminals served by the small base stations.

(3) In a case that the operating mode is the massive-connection low power mode, a clustering mechanism may be adopted. In the clustering mechanism, adjacent user terminals are formed into a mesh or tree-like topology cluster. Packet traffic generated by the cluster members is delivered to a selected cluster head through device-to-device or multi-hop relay. The cluster head would directly access the radio access network. The cluster head is a user terminal, of which the number of connected user terminals is more than a preset threshold $\theta 3$, and the cluster members are user terminals in the cluster except the cluster head.

The packet traffic generated by the cluster members is delivered to the selected cluster head through device-to-device or multi-hop relay, which further includes: utilizing a deep reinforcement learning algorithm to select an appropriate route for the cluster members. According to the deep reinforcement learning algorithm, a state of it is obtained and is used to determine the appropriate route. The state is related to the amount of data to be transmitted by a current cluster member and remaining energy of a next-hop cluster member, and the reward of the deep reinforcement learning algorithm is related to the total power consumption. Through routing to the cluster head which directly accesses the radio access network, numerous cluster members can access the network simultaneously. Moreover, a smaller transmission subcarrier bandwidth may be adopted considering the small data characteristic. The function configuration of base stations is optimized to reduce the signaling overhead, for example, simplifying the physical channel design.

The cluster head directly accessing the radio access network may further include the following. The cluster head and user terminals that do not have the networking capability would access a base station through contention-based grant-free access, so that the user terminals can quickly access the radio access network. The cluster head is selected according to one or more of its caching capability, the number of connected cluster members (service processing capability), the remaining energy, and the state of link to the radio access network. The stronger the caching capability is, the higher the service processing capability is, and the more sufficient the remaining energy is, the larger probability a user terminal is selected as the cluster head. In the cluster, the number of connections is increased and power consumption is reduced by optimizing data collecting and reporting frequency.

(4) In a case that the operating mode is the low-latency high-reliability mode, an F-AP, of which a transmission delay is less than a preset threshold $\theta 4$ is utilized, to enable user terminals to be connected to the radio access network with a multiple access method; or If a transmission delay between an F-AP and a target user terminal is greater than a preset threshold $\theta 4$, while a transmission delay between the target user terminal and its neighbor user terminal is less than the preset threshold $\theta 4$, the target user terminal accesses the neighbor user terminal with a device-to-device communication method.

The F-AP is capable of handling not only radio signal and symbol processing, but also baseband signal physical processing and radio resource management control. Accordingly, the F-AP may have corresponding processing and control modules. Besides, the F-AP has an application layer function and a control management function, so that mobile data processing can be realized locally. The introduction of F-APs reduces the number of routing and forwarding nodes, which further reduces the end-to-end delay. By optimizing the number and function of the F-APs' protocol stack, the air interface delay is reduced. Through local cooperative communication among F-APs, the link reliability is improved in combination with advanced multiple access technology, coding technology and retransmission mechanism.

An area covered by the radio access network may be classified into different service environments according to the user behavior information and the service attributes. Different service environments in a single time period may only correspond to one operating mode of the radio access network. Adjacent time periods may have different operating modes, and may be updated every the cycle T1.

Different service types may be handled as a combination of the three service types.

If the four operating modes cannot meet the service requirements, the method may further include the following. The central computing logic module receives updated reported data which includes the measurement report data from the user terminals, the wireless transmission data from the base stations, and the operation and maintenance data from the radio access network. Based on the reported data obtained during the cycle T1 and the proper machine learning algorithm, the central computing logic module configures more operating modes of radio access network that match the user behavior, the service attributes, and the performance indicators of the radio access network. The edge computing logic module receives the operating mode information from the central computing logic module. According to the operating mode, the edge computing logic module, during a cycle T2, determines whether the current configuration of the edge communication entity meets the networking aim. The specific process is described in detail below.

Step 130: The edge computing logic module receives the operating mode information from the central computing logic module. According to the operating mode, the edge computing logic module, during the cycle T2, determines whether the current configuration of the edge communication entity meets the networking aim. The cycle T2 is shorter than the cycle T1. The cycle T1 may be N times the cycle T2, that is, T1=N×T2, where N is a positive integer.

Figure 3:
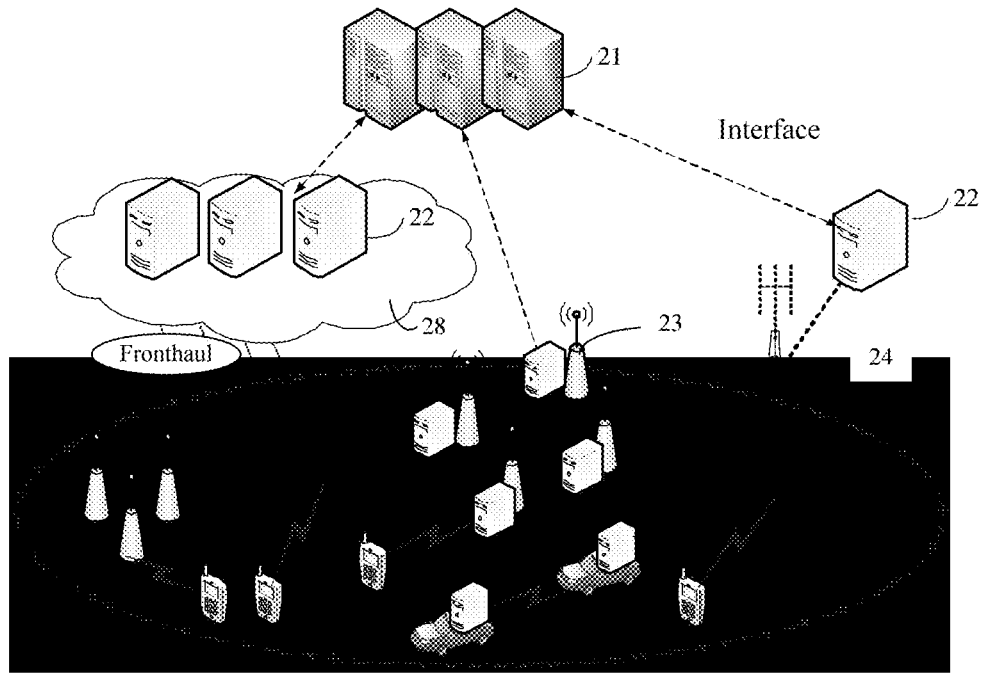
FIG. 3 is an illustration of the central computing logic module and edge computing logic modules in an F-RAN according to embodiments of the present disclosure.

A computing logic module in the edge communication entity is referred to as an edge computing logic module. The edge computing logic module is located at the edge of the wireless access network. As shown in FIG. 3, the F-RAN includes: a central computing logic module 21, an edge computing logic module 22, an F-AP 23, a macro base station 24, an RRH 25, a user terminal (UE) 26, a small base station 27, and a BBU Pool 28. Specifically, the edge computing logic module may be deployed at a high-power node (HPN), such as a Radio Network Controller (RNC) in a 3G network, in a BBU Pool 28 or F-AP 23. The edge communication entity forms the distributed fog in which limited resources are available for a deep reinforcement learning algorithm with lower computational resource overhead relative to the central computing logic module. The fog is close to the network edge, hence is of high real-time and is convenient for network expansion.

The aim of the networking is that the service performance requirements are met, and the KPIs provided by the radio access network are greater than the corresponding thresholds, and the resource utilization is greater than the corresponding threshold. The thresholds may be set according to actual needs.

Step 140: If the current configuration meets the aim, the edge computing logic module allocates resources to the user terminals connected to the edge communication entity. The edge communication entities and user terminals that are allocated with proper resources are networked as an F-RAN. The resources may include radio resources, computing resources, and caching resources.

The edge computing logic module allocates the resources to the user terminals connected to the edge communication entity according to the operating mode, which further includes the following:

The edge communication entity has been initialized and configured to complete resource allocation for the user terminals. The configuration of the edge communication entity includes the completion of data mining and model training. The input information for the data mining and model training in the edge computing logic module may be from the user terminals and their access nodes. The input information may include, but is not limited to, the access node service attribute, the networking performance of the access node, and the cache status of the access node. The output information of the edge computing logic module may include, but is not limited to, the activation of base station, transmission power optimization, antenna tilt angle optimization, caching content update optimization, content pre-push, and optimization of mobility parameters; The networking performance of the access node includes: interference distribution of the access node, coverage, average delay and delay jitter duration, number of active nodes, average throughput, and average user transmission capacity.

The resource allocation of the edge communication entity also includes the completion of data mining and model training. The input information for the data mining and model training may be about link information between access nodes, which may be, but not limited to, a load and a cache status of the node. The output information of the edge computing logic module is an allocation strategy on radio resources, computing resources, and caching resources for different activated users.

Compared with existing techniques, the present disclosure achieves fog radio access networking automatically based on the machine learning algorithms With information perceived actively, the radio access networks adapt to various services. Compared with existing techniques, manual intervention is not required, and labor costs are reduced; it is not necessary to configure preset thresholds for various information parameters, which makes the adaptability and flexibility better and higher. Moreover, since no manual work is required and the information parameters are configured automatically, the impacts of hysteresis or delay become negligible.

Figure 4:
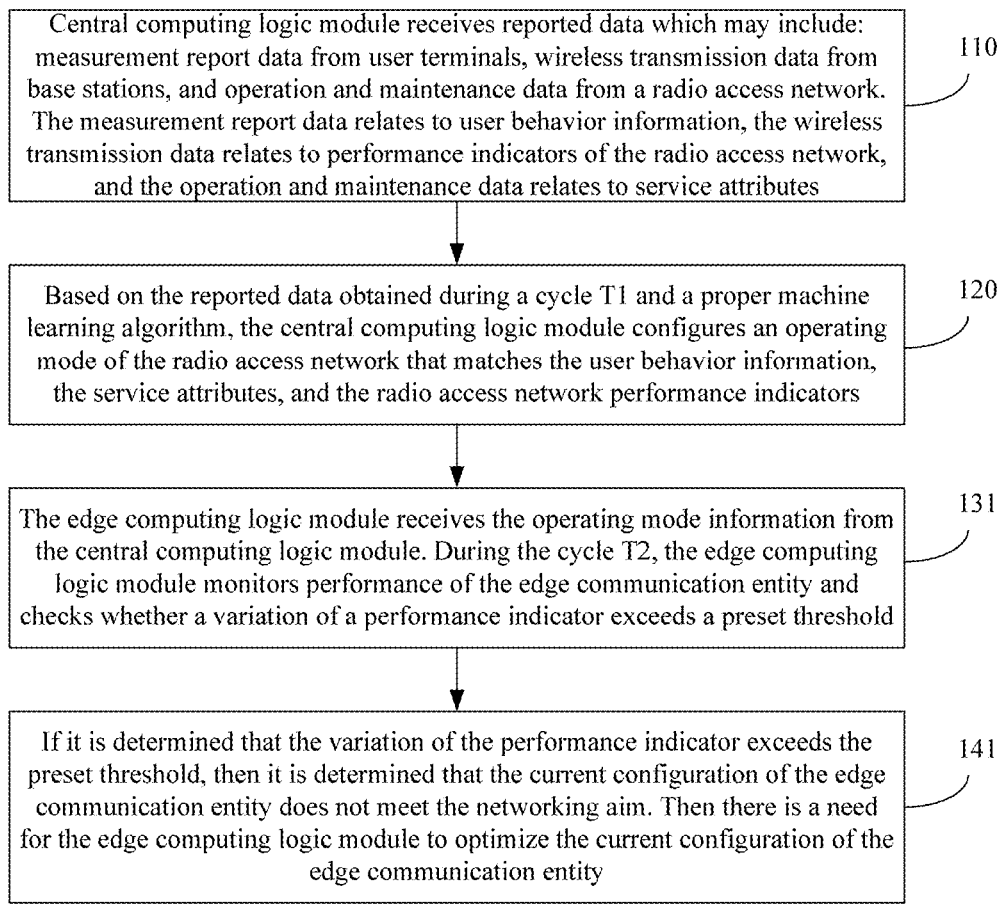
FIG. 4 is another flow chart of an artificial intelligence-based networking method for F-RANs according to embodiments of the present disclosure.

Combining FIG. 1 with FIG. 4, the step 130 may further include, but is not limited to:

Step 131: During the cycle T2, the edge computing logic module monitors performance of the edge communication entity and checks whether a variation of a performance indicator exceeds a preset threshold.

After the above step 130, the method may further include, but is not limited to:

Step 141: If it exceeds, then it is determined that the current configuration of the edge communication entity does not meet the networking aim. Then there is a need for the edge computing logic module to optimize the current configuration of the edge communication entity.

The variation of performance indicator may include, but is not limited to, a significant decrease in the user data rate, an interference level, or a delay level exceeding a preset threshold. The preset threshold may be set according to the user's needs.

The preset threshold may be a fluctuation range value adapted to the actual situation, which is obtained by using deep reinforcement learning algorithms. If the obtained quality of service and the number of active user terminals do not exceed the preset thresholds, it is indicated that the network fluctuation is not obvious, the radio access network state is stable during the preset time period, the service demands do not change much, and the quality of service and the number of requests from user terminals are satisfied. Hence, the current configuration of the edge communication entity meets the networking aim.

If the obtained quality of service and the number of active user terminals do exceed the preset thresholds, it is indicated that the network fluctuation is obvious, and the radio access network state is un-stable during the preset time period. The artificial intelligence-based networking method could not guarantee the quality of service and support the number of requests from user terminals during the current preset time period. Hence, the edge computing logic module optimizes the configuration of the edge communication entity to minimize the variation of target performance. With a proper operating mode, the F-RAN meets the real-time requirements of different services and improves network performance.

In this way, the performance of the edge communication entity is monitored in real time. Once the preset performance parameter of the edge communication entity exceeds the preset threshold, it indicates that a large performance fluctuation occurs, and the resource allocation is used to stabilize the service performance.

The step 141 may further include, but is not limited to: using a deep reinforcement learning algorithm to learn the data related to the user terminals, and obtaining a strategy to perform configuration optimization of the edge communication entity.

Figure 5:
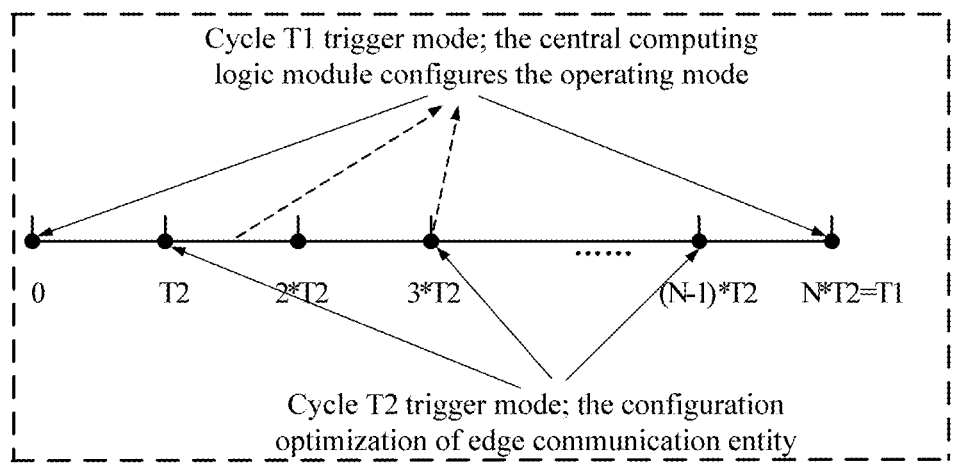
FIG. 5 is an illustration of a timeline of the operating mode selection at the central computing logic module and edge communication entity configuration at the edge computing logic module according to embodiments of the present disclosure.

As shown in FIG. 5, a specific process of step 141 is performed. In step 1, after the edge computing logic module receives the operating mode information from the central computing logic module, a timer starts timing from T=0; the edge computing logic module optimizes the configuration according to the data from the user terminals and their access points; Every cycle T2, the edge computing logic module needs to check whether the current configuration of the edge communication entity meets the networking aim. According to the check result, the edge computing logic module determines whether there is a need to optimize the current configuration of the edge communication entity.

In the step 2, if it does not meet, the edge communication entity performs a configuration optimization.

In the step 3, if the configuration optimization performed by the edge computing logic module fails to meet the networking aim, there is a need to re-configure the operating mode to realize the networking aim. If it meets, the above steps 1 to 3 are repeated for a next cycle T2.

In order to better illustrate the step 141, the step 141 may further include, but is not limited to, the following steps:

(1) In the case that the operating mode is the wide-area seamless coverage mode, the edge computing logic module utilizes a deep reinforcement learning algorithm DRL1 to optimize the edge communication entities, where transmission power and a handover parameter of the macro base stations are optimized;

The state of the DRL1 may include, but is not limited to, the coverage status of access nodes, the interference distribution of access nodes, and link information between access nodes. The action of the DRL1 may refer to the discrete transmission power and the handover parameter of the access nodes. The reward function of the DRL1 may refer to the number of user terminals whose outrage rate is greater than a preset threshold. The DRL1 can realize distributed transmission power optimization of the network nodes with lower computational complexity.

(2) In the case that the operating mode is the hotspot high capacity mode, the edge computing logic module utilizes a deep reinforcement learning algorithm DRL2 to optimize the edge communication entities, where the number of activated small base stations or RRHs and update of the cached content are optimized;

The state of the DRL2 may include, but is not limited to, the cache state feature which indicates the number of access requests for cached content during a preset time period, the interference distribution of access nodes, and link information between access nodes. The action of the DRL2 may refer to file replacement and activation of access nodes. The reward function of the DRL2 may refer to the average throughput of all access points. The DRL2 can optimize the number of activated access nodes and caching contents with lower computational complexity. The preset time period may be for example, an hour, a day, or a week.

(3) In the case that the operating mode is the massive-connection low power mode, the edge computing logic module utilizes a decision tree algorithm and a machine learning algorithm to optimize the edge communication entities, where a decision tree model is trained to select the cluster head and the machine learning algorithm is utilized to optimize routing from the cluster members to the cluster head.

The decision conditions of the above decision tree model include the distance between each cluster member and the cluster head, and the buffering capacity, the number of connections, and the remaining energy of each user terminal. By using the decision tree model, the amount of data to be transmitted by a current node and the remaining energy of nodes/user terminals in the cluster are both considered. Besides, the decision tree model can help to select the cluster head quickly, and guarantee the low energy consumption of all user terminals in the cluster. After the cluster head is selected, the preset learning algorithm is used to select a route from a cluster member to the cluster head. The state in the preset learning algorithm is defined as the current node, the action is defined as the node selection on the next hop, and the reward function is a weighted sum of success and failure of data transmission to a node of the next hop. Taking into account the computing power of the nodes, the preset learning algorithm reduces the total energy consumption. The current node is the current user terminal; the node selection on the next hop refers to the selection of an adjacent user terminal of the current user terminal as the next hop.

(4) In the case that the operating mode is the low-latency high-reliability mode, the edge computing logic module utilizes a deep Bayesian learning algorithm to optimize the edge communication entities. According to historical information on the access nodes of user terminals, the future access node selection of a user terminal is predicted, and mobility-related parameters of the access node are optimized. Moreover, the deep reinforcement learning algorithm is also adopted here to perform distributed resource allocation. The state of the deep reinforcement learning algorithm herein may include, but is not limited to, the delay and remaining data of the user terminals, the interference distribution of the access nodes, and the link information between the access nodes. The action of the deep reinforcement learning algorithm may refer to the transmission power of the access nodes; the reward function of the deep reinforcement learning algorithm may refer to the weighted sum of the average throughput and delay; the deep reinforcement learning algorithm can realize distributed transmission power optimization with lower computational complexity.

The edge computing logic module checks whether the optimized edge communication entity meets the networking aim. If it meets, the edge computing logic module allocates resources to the user terminals connected to the edge communication entity. The edge communication entities and user terminals that are allocated with proper resources are networked as an F-RAN. Otherwise, there is a need to re-configure the operating mode for realizing the networking aim.

In a possible implementation, in order to form an F-RAN, in conjunction with FIG. 1, the method further includes the following steps 132 to 134 after step 130:

In the step 132, it is checked whether the current resources allocated by the edge communication entity meet the networking aim.

The radio resources may include, but are not limited to, a combination of one or more of the following: a time domain resource, a frequency domain resource, a code domain resource, a space domain resource, and a power domain resource; the caching resource includes an available storage space, a file content, and a content caching replacement; and the computing resource may refer to the local data processing capability of each user terminal and the deep reinforcement learning algorithms used. The computing resources may also include, but are not limited to, data computing capabilities that support machine learning and model training; performance related to resource allocation includes a user experience rate, a peak rate, a transmission delay, etc. The configuration related to resource allocation includes a transmission mode, a band resource, and a cache configuration.

In the step 133, if not, the edge computing logic module optimizes allocation of resources to the configured edge communication entity during a cycle T3, where the cycle T3 is shorter than the cycle T2.

Figure 6:
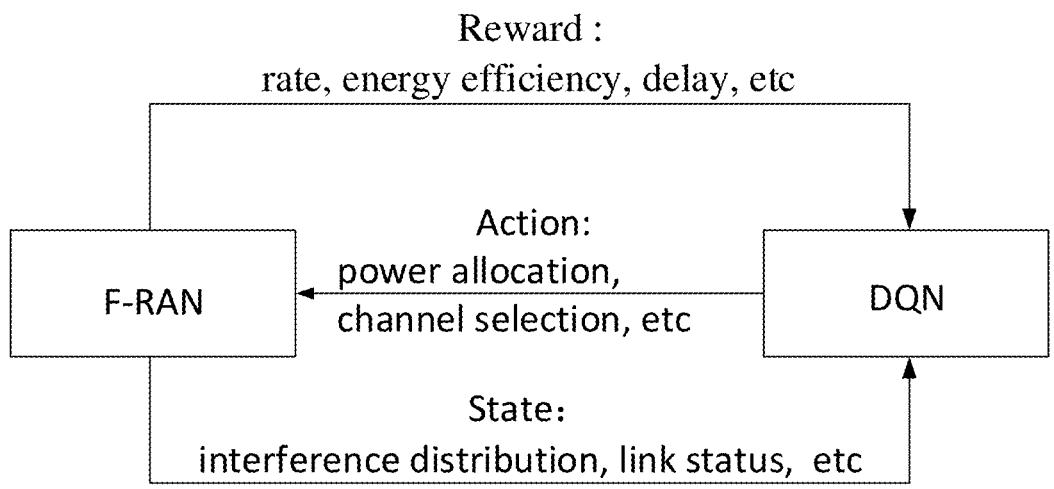
FIG. 6 is an illustration of resource scheduling based on deep reinforcement learning in the edge computing logic module according to embodiments of the present disclosure.

For different operating modes of the radio access network, the edge computing logic module optimizes the allocation of radio resources, computing resources, and caching resources of the configured edge communication entity in different ways. As shown in FIG. 6, the edge computing logic module selects an action according to a certain/certain rewards, so that the resource allocation based on Deep Q Network (DQN) can maximize the benefit in a continuous period. The state is jointly defined by interference distribution, link status, buffer status, available computing resources, etc. The actions include power allocation, channel selection, file buffering, computing resource allocation, etc. The reward function is selected from one or more of the following: rate, energy efficiency, delay, etc.

The following is a detailed description on the allocation of the radio resources, computing resources, and caching resources for the edge communication entity in the cycle T3 by the edge computing logic module:

In the case that the operating mode is the wide-area seamless coverage mode, the edge computing logic module, during the cycle T3, allocates the radio resources by using a deep reinforcement learning algorithm DRL3. The reward function of the DRL3 is the coverage of an access node, and the state of the DRL3 is the interference distribution and the link status In the case that the operating mode is the hotspot high capacity mode, the edge computing logic module, during the cycle T3, allocates the radio resources and the caching resources by using a deep reinforcement learning algorithm DRL4. The reward function of the DRL4 is a weighted sum on an average throughput of the user terminals and an average capacity of access nodes, and the state of the DRL4 is the interference distribution and a cache status.

In the case that the operating mode is the massive-connection low power mode, the edge computing logic module, during the cycle T3, allocates the radio resources and the computing resources by using a deep reinforcement learning algorithm DRL5. The reward function of the DRL5 is the number of activated access nodes, and the state of the DRL5 is the interference distribution and available computing resources.

In the case that the operating mode is the low-latency high-reliability mode, the edge computing logic module, during the cycle T3, allocates the radio resources and the caching resource by using a deep reinforcement learning algorithm DRL6. The reward function of the DRL6 is a weighted sum on an average delay and a delay jitter duration, and the state of the DRL6 is the interference distribution and a cache state.

The edge computing logic module checks whether optimized resource allocation meets the networking aim. If it meets, the edge communication entities and user terminals that are allocated with proper resources are networked as an F-RAN. Otherwise, there is a need to re-optimize the configuration of the edge communication entities.

The radio resource allocation may include, but is not limited to, increasing time domain resources, frequency domain resources, code domain resources, space domain resources, and/or power domain resources; the caching resource allocation may include changing available storage space, and changing cached file content; changing available storage space may include, but is not limited to, making use of storage space of more caching nodes in a hotspot, and increasing caching space; changing cached file content may refer to that, but is not limited to, files caching in a storage of nodes in a hotspot are updated with files that bring higher rewards (when using the deep reinforcement learning algorithms); and the computing resource allocation may refer to improving the local data processing capability of a terminal, and adopting more advanced deep reinforcement learning algorithms.

The cycle T2 may be M times the cycle T3, that is, T2=M×T3, where M is a positive integer.

In step 134, if the current configuration meets the networking aim, the edge computing logic module allocates the resources to the user terminals connected to the edge communication entity. The edge communication entities and user terminals that are allocated with proper resources are networked as an F-RAN. The resources include radio resources, computing resources, and caching resources which can be denoted as multi-dimensional resources.

According to the present disclosure, the central computing logic module adjusts the operating mode, while the edge computing logic module optimizes the edge communication entities continuously according to dynamic changes of user behavior, service attributes, and performance indicators, so that the radio access network can always meet the differentiated network requirements.

Figure 7:
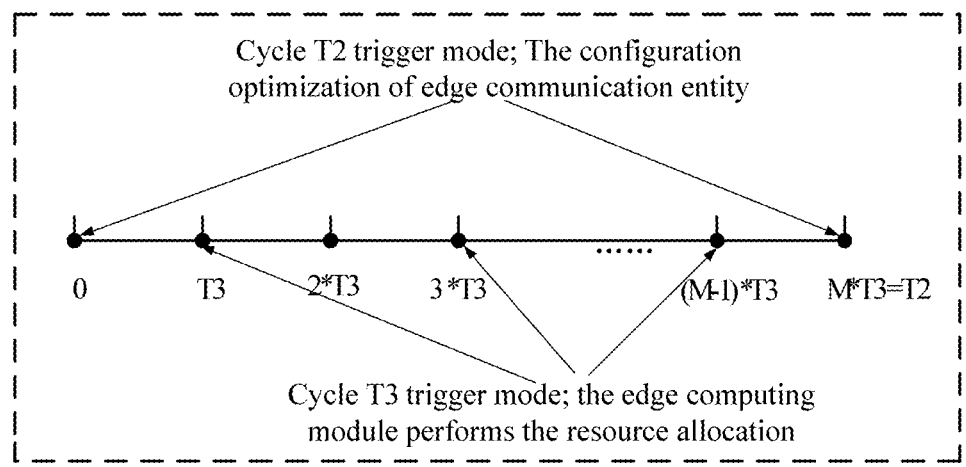
FIG. 7 is an illustration of a timeline of edge communication entity configuration at the edge computing logic module and resource allocation optimization at the edge computing logic module according to embodiments of the present disclosure.

With reference to FIG. 7, the edge computing logic module optimizes the allocation of the radio resources, computing resources, and caching resources during the cycle T3:

In the step 1, the edge computing logic module monitors and evaluates the performance and configuration of a current communication entity and access users related to the radio resources, computing resources, and caching resources allocation. Starting from the T=0 timing, the edge computing logic module needs to determine whether the currently allocated resources satisfies the networking aim. Based on the result, the edge computing logic module determines whether it is necessary to trigger the optimization of the edge communication entity resource allocation algorithm. If the current resource allocation satisfies the networking aim, and the service can meet the performance requirements, the current resource allocation would be maintained and step 133 is skipped; otherwise, the following step 2 and 3 are performed. The edge computing logic module uses artificial intelligence to perform a predictive diagnosis and optimize the resource scheduling algorithm.

In the step 2, the edge computing logic module enters the trigger state to optimize the resource allocation of the edge communication entity. Here, taking the deep reinforcement learning as an example, referring to FIG. 7, the edge computing logic module performs actions according to the rewards brought by different actions in the current state. The choice according to the resource allocation strategy obtained by deep reinforcement learning maximizes the benefits in a continuous time.

In the step 3, after the resource adjustment is completed, the edge computing logic module monitors the performance and checks whether the networking aim is met. If it is not met, the edge computing logic module directly jumps to the cycle T2 and triggers the configuration optimization of edge communication entity; If it is met, then the edge computing logic module continues monitoring until the time reaches an integral multiple of the cycle T3, and performs the next round of resource allocation; Note that when the timing reaches M times the cycle T3 (i.e., the cycle T2), the edge computing logic module determines whether it is necessary to enter the cycle T2 and triggers the configuration optimization of edge communication entity.

Figure 8:
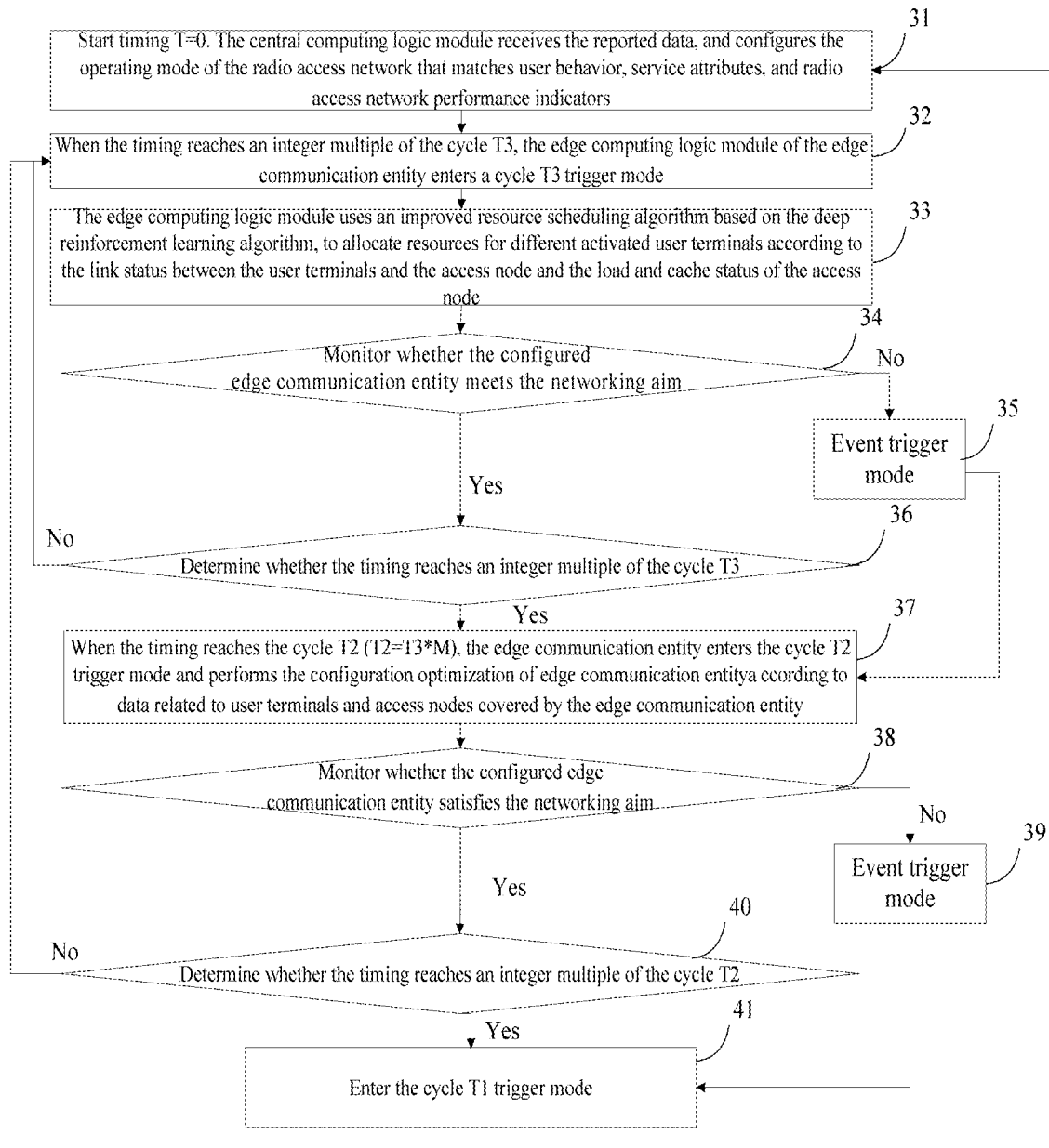
FIG. 8 is a flow chart of an implementation of the fog radio access networking method according to embodiments of the present disclosure.

Referring to FIG. 8, based on artificial intelligence, the overall process of realizing fog radio access networking is completely presented.

Step 31: Start timing T=0. The central computing logic module receives the reported data, and configures the operating mode of the radio access network that matches user behavior, service attributes, and performance indicators of the radio access network. In this way, the radio access network completes initialization, which includes the function configuration and resource allocation of the edge communication entity.

Step 32: When the timing reaches an integer multiple of the cycle T3, the edge computing logic module of the edge communication entity enters a cycle T3 trigger mode and performs resource allocation.

Step 33: The edge computing logic module uses an improved resource scheduling algorithm based on the deep reinforcement learning algorithm, to allocate resources for different activated user terminals according to the link status between the user terminals and the access node and the load and cache status of the access node.

Step 34: The edge computing logic module monitors whether the configured edge communication entity meets the networking aim.

Step 35: If it is determined that the configured edge communication entity fails to meet the networking aim, the edge computing logic module enters the event trigger mode, that is, jumping directly to the cycle T2 trigger mode and perform the configuration optimization of the edge communication entity.

Step 36: If it is determined that the configured edge communication entity satisfies the networking aim, the edge computing logic module determines whether the timing reaches an integer multiple of the cycle T3. When the timing does not reach the integer multiple of the cycle T3, the edge computing logic module returns to perform the above step 32, and repeat the above step 32~36, until it determines that the timing reaches the cycle T2 (T2=T3*M), step 37 is performed.

Step 37: When the timing reaches the cycle T2 (T2=T3*M), the edge communication entity enters the cycle T2 trigger mode and performs the configuration optimization of edge communication entity according to data related to user terminals and access nodes covered by the edge communication entity.

Step 38: The edge communication entity monitors whether the configured edge communication entity satisfies the networking aim. If it is determined that the configured edge communication entity meets the networking aim, then the edge communication entity checks whether the timing reaches the cycle T1 (T1=T2*N). If reaches, step 40 is performed.

Step 39: If it is determined that the configured edge communication entity does not meet the networking aim, the edge communication entity monitors enters the event trigger mode, that is, jumping directly to the cycle T1 trigger mode, and performs selection on the radio access network operating mode.

Step 40: The edge communication entity determines whether the timing reaches an integer multiple of the cycle T2, and if the timing does not reach the integral multiple of the cycle T2, the edge communication entity returns to step 32 to continue execution.

Step 41: When the timing reaches the cycle T1 (T1=T2*N), the central computing logic module enters the cycle T1 trigger mode, and the central computing logic module configures the operating mode of radio access network that matches user behavior, service attributes, and performance indicators of the radio access network.

Compared with existing techniques, the present disclosure achieves fog radio access networking automatically based on the machine learning algorithms With information perceived actively, the radio access networks adapt to various services. Compared with existing techniques, manual intervention is not required, and labor costs are reduced; it is not necessary to configure preset thresholds for various information parameters, which makes the adaptability and flexibility better and higher. Moreover, since no manual work is required and the information parameters are configured automatically, the impacts of hysteresis or delay become negligible.

The artificial intelligence-based networking device provided by the embodiment of the present disclosure is further described below.

Figure 9:
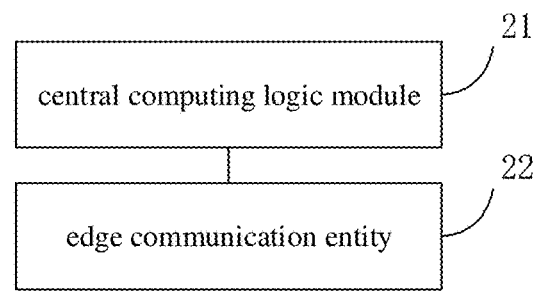
FIG. 9 is an illustration of an artificial intelligence-based networking device for F-RANs according to embodiments of the present disclosure.

As shown in FIG. 9, the embodiment of the present disclosure further provides an artificial intelligence-based networking device, including the following:

A central computing logic module 21 is configured to receive reported data which includes: measurement report data from user terminals, wireless transmission data from base stations, and operation and maintenance data from a radio access network. The measurement report data relates to user behavior, the wireless transmission data relates to performance indicators of the radio access network, and the operation and maintenance data relates to service attributes.

The central computing logic module 21 is further configured to: based on the reported data obtained during cycle T1 and a proper machine learning algorithm, the central computing logic module configures an operating mode of the radio access network that matches the user behavior, the service attributes, and the performance indicators of the radio access network.

The edge computing logic module 22 of the edge communication entity is configured to receive information of the operating mode of the radio access network from the central computing logic module. According to the operating mode, the edge computing logic module, during a cycle T2, determines whether a current configuration of an edge communication entity where the edge computing logic module is located meets a networking aim. The cycle T2 is shorter than the cycle T1.

The edge computing logic module 22 is further configured to: if the current configuration of the edge communication entity meets the networking aim, the edge computing logic module allocates resources to the user terminals connected to the edge communication entity. The edge communication entity and the user terminals that are allocated with the resources are networked as an F-RAN. The resources include radio resources, computing resources, and caching resources.

Figure 10:
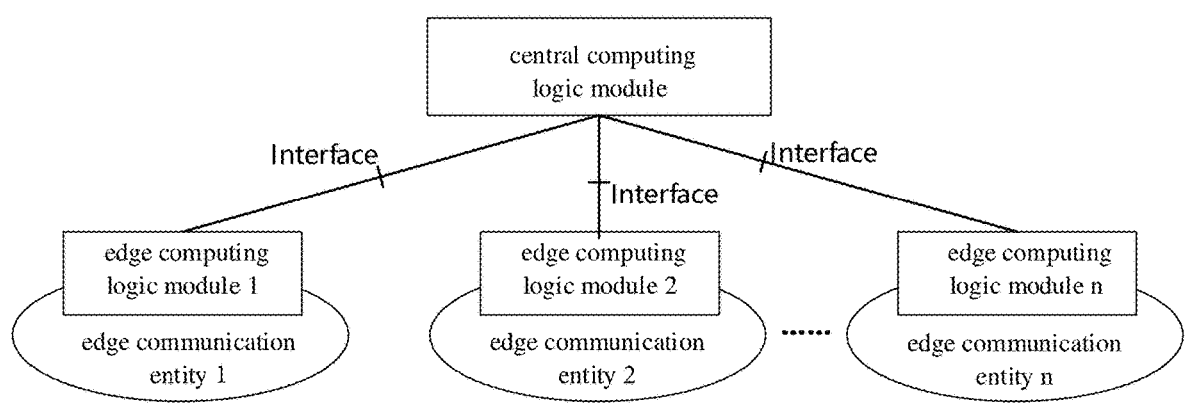
FIG. 10 is architecture of centralized management under the unified control of the central computing logic module according to embodiments of the present disclosure.

There is an information interaction interface between the central computing logic module and the edge communication entity. As shown in FIG. 10, there are n edge communication entities. Each edge communication entity has an edge computing logic module, and the central computing logic module performs machine learning based on the measurement report data from the user terminals, the wireless transmission data from the base stations, and the operation and maintenance data from the radio access network, and obtains the operating mode of the radio access network that matches the user behavior, the service attributes, and the radio access network performance indicators. The operating mode is a main reference to the configuration optimization of the edge communication entity and the resource allocation for the edge computing logic modules. After completing the configuration and the resource allocation, the edge communication entity measures the wireless data related to the user terminals and the base stations, and reports the feedback to the central computing logic module for data mining and model training.

Compared with existing techniques, the present disclosure achieves fog radio access networking automatically based on the machine learning algorithms With information perceived actively, the radio access networks adapt to various services. Compared with existing techniques, manual intervention is not required, and labor costs are reduced; it is not necessary to configure preset thresholds for various information parameters, which makes the adaptability and flexibility better and higher. Moreover, since no manual work is required and the information parameters are configured automatically, the impacts of hysteresis or delay become negligible.

In a possible implementation, the machine learning algorithms may be representation learning algorithms, which include:

obtaining dimension-reduced data from the reported data through data feature classification; and analyzing latent factors existing in the dimension-reduced data and constructing a valid representation, and outputting the operating mode of the radio access network that matches the user behavior, the service attributes, and the performance indicators of the radio access network.

In a possible implementation, in a case that the operating mode is a wide-area seamless coverage mode, macro base stations with high transmission power are implemented. A user terminal selects a serving macro base station according to the strongest received power. The macro base stations are configured with completed protocol stack functions. Techniques/methods like multi-input multi-output (MIMO) and advanced multiple access are also configured.

In a case that the operating mode is a hotspot high capacity mode, small base stations are used to connect user terminals at a hotspot to the radio access network. If interference of the small base stations is higher than a preset threshold θ1 or an average capacity of user terminal at the hotspot is higher than a preset threshold θ2, the small base stations are transformed to RRHs. Other functions of the small base stations including functions on a physical layer, a media access control (MAC) layer, and a radio resource control (RRC) layer are moved to a base station unit (BBU) pool. The centralized BBU pool is connected to the RRHs through fronthaul links.

In a case that the operating mode is a massive-connection low power mode, a clustering mechanism is adopted. In the clustering mechanism, adjacent user terminals are formed into a mesh or tree-like topology cluster. Packet traffic generated by cluster members is delivered to a selected cluster head through device-to-device or multi-hop relay. The cluster head would directly access the radio access network. The cluster head is a user terminal, of which the number of connected user terminals is more than a preset threshold θ3, and the cluster members are user terminals in the cluster except the cluster head.

In a case that the operating mode is a low-latency high-reliability mode, an F-AP, of which a transmission delay is less than a preset threshold θ4 is utilized to enable user terminals to be connected to the radio access network with a multiple access method.

If a transmission delay between the F-AP and a target user terminal is greater than a preset threshold θ4, while a transmission delay between the target user terminal and its neighbor user terminal is less than the preset threshold θ4, the target user terminal accesses the neighbor user terminal with a device-to-device communication method.

In a possible implementation, the central computing logic module is further configured to monitor the measurement report data from all the user terminals in the radio access network, and checks whether an obtained quality of service and the number of active user terminals exceed respective preset thresholds. If not, a duration of the cycle T1 is extended; otherwise the duration of the cycle T1 is shortened.

In a possible implementation, the edge computing logic module is used to:

during the cycle T2, the edge computing logic module monitors the performance of the edge communication entity and checks whether the variation of a target performance indicator exceeds a preset threshold;

The edge computing logic module is also used to:

if the variation of the performance indicator exceeds the preset threshold, determine that the current configuration of the edge communication entity does not meet the networking aim. Then there is a need for the edge computing logic module to optimize the current configuration of the edge communication entity.

Figure 11:
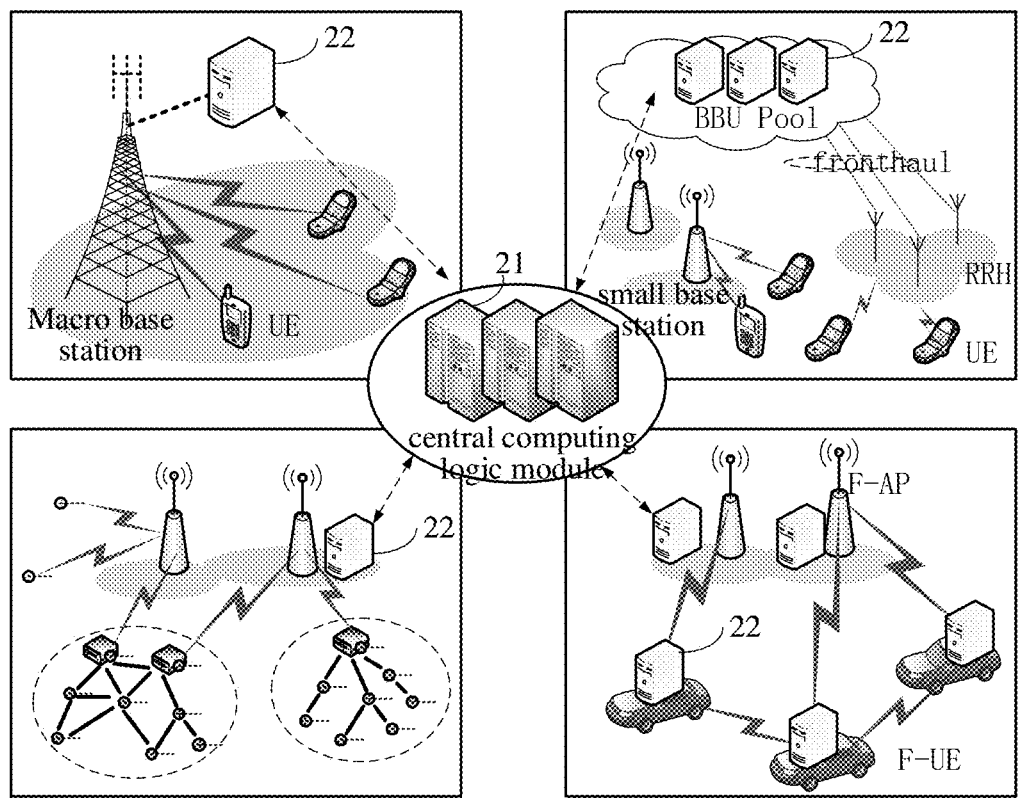
FIG. 11 is an illustration of architecture corresponding to operating modes of an F-RAN according to embodiments of the present disclosure.

Referring to FIG. 11, the operating mode of the radio access network may specifically include, but is not limited to, a wide-area seamless coverage, a hotspot high capacity mode, a massive-connection low power mode, and a low-latency high-reliability mode. In a possible implementation, the edge computing logic module is used to:

in a case that the operating mode is the wide-area seamless coverage mode, the edge computing logic module utilizes a deep reinforcement learning algorithm DRL1 to optimize the edge communication entities, where transmission power and a handover parameter of the macro base stations are optimized;

in a case that the operating mode is the hotspot high capacity mode, the edge computing logic module utilizes a deep reinforcement learning algorithm DRL2 to optimize the edge communication entities, where the number of activated small base stations or RRHs and update of cached content are optimized;

in a case that the operating mode is the massive-connection low power mode, the edge computing logic module utilizes a decision tree algorithm and a machine learning algorithm to optimize the edge communication entities, where a decision tree model is trained to select the cluster head and the machine learning algorithm is utilized to optimize routing from the cluster members to the cluster head; or In a case that the operating mode is the low-latency high-reliability mode, the edge computing logic module utilizes a deep Bayesian learning algorithm to optimize the edge communication entities. According to historical information on an access node of a user terminal, a future access node selection of the user terminal is predicted, and mobility-related parameters of the access node are optimized.

The edge computing logic module checks whether the optimized edge communication entity meets the networking aim. If meets, the edge computing logic module allocates the resources to the user terminals connected to the edge communication entity. The edge communication entities and the user terminals that are allocated with the proper resources are networked as an F-RAN. Otherwise, there is a need to re-configure the operating mode to achieve the networking aim.

In a possible implementation, the edge computing logic module is further configured to:

if current resources allocated by the edge communication entity do not meet the networking aim, the edge computing logic module optimizes allocation of the current resources to the configured edge communication entity during a cycle T3, where the cycle T3 is shorter than the cycle T2.

In a possible implementation, the edge computing logic module is used to perform the following.

In the case that the operating mode is the wide-area seamless coverage mode, the edge computing logic module, during a cycle T3, allocates the radio resources by using a deep reinforcement learning algorithm DRL3. The reward function of the DRL3 is coverage of an access node, and a state of the DRL3 is interference distribution and a link status.

In the case that the operating mode is the hotspot high capacity mode, the edge computing logic module, during the cycle T3, allocates the radio resources and the caching resources by using a deep reinforcement learning algorithm DRL4. A reward function of the DRL4 is a weighted sum on an average throughput of the user terminals and an average capacity of access nodes, and a state of the DRL4 is the interference distribution and a cache status.

In the case that the operating mode is the massive-connection low power mode, the edge computing logic module, during the cycle T3, allocates the radio resources and the computing resources by using a deep reinforcement learning algorithm DRL5. A reward function of the DRL5 is the number of activated access nodes, and a state of the DRL5 is the interference distribution and available computing resources.

In the case that the operating mode is the low-latency high-reliability mode, the edge computing logic module, during the cycle T3, allocates the radio resources and the caching resources by using a deep reinforcement learning algorithm DRL6. A reward function of the DRL6 is a weighted sum on an average delay and a delay jitter duration, and a state of the DRL6 is the interference distribution and a cache state.

The edge computing logic module checks whether the optimized resource allocation meets the networking aim. If it meets, the edge communication entity and the user terminals that are allocated with proper resources are networked as an F-RAN. Otherwise, there is a need to re-optimize the configuration of the edge communication entity.

The embodiment of the present disclosure provides a computer readable storage medium, in which the storage medium stores a computer program, and when the computer program is executed by a processor, the steps of the artificial intelligence-based networking method are implemented. Embodiments of the present disclosure provide a computer program that, when run on a computer, causes the computer to perform the steps of the above-described artificial intelligence-based networking method.

It should be noted that, in this context, relational terms such as T1 and T2 are used merely to distinguish one entity or operation from another entity or operation, and do not necessarily require or imply that there is a relation or an order between such entities or operations. Furthermore, the terms "comprising," "comprises," or "include" means non-exclusive inclusion. An element that is defined by the phrase "comprising a . . . " does not exclude the presence of additional equivalent elements in the process, method, item, or device that comprises the element.

The various embodiments in the present disclosure are described in a related manner, and the same or similar parts between the various embodiments may be referred to each other, and each embodiment focuses on the differences from the remaining embodiments. In particular, for the device/storage medium/computer program embodiment, since it is substantially similar to the method embodiment, the description thereof is relatively simple, and the relevant parts may be referred to the description of the method embodiment.

The above is only the preferred embodiment of the present disclosure and is not intended to limit the scope of the present disclosure. Any modifications, equivalents, improvements, etc. made within the spirit and scope of the disclosure are intended to be included within the scope of the disclosure.

What is claimed is:

1. An artificial intelligence-based networking method for fog radio access networks (F-RANs), comprising:
    receiving, by a central computing logic module, reported data which includes: measurement report data from user terminals, wireless transmission data from base stations, and operation and maintenance data from a radio access network, wherein the measurement report data relates to user behavior, the wireless transmission data relates to performance indicators of the radio access network, and the operation and maintenance data relates to service attributes;
    configuring, by the central computing logic module, based on the reported data obtained during a cycle T1 and a first machine learning algorithm, an operating mode of the radio access network that matches the user behavior, the service attributes, and the performance indicators of the radio access network;

receiving, by an edge computing logic module, information of the operating mode of the radio access network from the central computing logic module, and determining, according to the operating mode of the radio access network, during a cycle T2, whether a current configuration of an edge communication entity corresponding to the edge computing logic module meets a networking performance aim which is that a variation of a performance indicator regarding performance of the edge communication entity does not exceed a preset threshold, wherein the cycle T2 is shorter than the cycle T1; and if the current configuration of the edge communication entity meets the networking performance aim, allocating, by the edge computing logic module, resources to the user terminals connected to the edge communication entity, to network the edge communication entity and the user terminals that are allocated with the resources as an F-RAN, wherein the resources comprise radio resources, computing resources, and caching resources.

2. The method according to claim 1, wherein, during the cycle T1, the first machine learning algorithm is a representation learning algorithm, and the representation learning algorithm comprises:

obtaining dimension-reduced data from the reported data through data feature classification; and analyzing latent factors existing in the dimension-reduced data and constructing a valid representation, and outputting the operating mode of the radio access network that matches the user behavior, the service attributes, and the radio access network performance indicators.

3. The method according to claim 1, wherein:

in a case that the operating mode of the radio access network is a wide-area seamless coverage mode, high power nodes which are macro base stations are implemented, and a user terminal selects a serving macro base station according to a strongest received power, wherein the macro base stations are configured with completed protocol stack functions and multi-input multi-output (MIMO) and advanced multiple access methods;

in a case that the operating mode of the radio access network is a hotspot high capacity mode, a small base station is used to connect user terminals at a hotspot to the radio access network, if interference of the small base station is higher than a preset threshold $\theta 1$ or an average capacity of user terminal at the hotspot is higher than a preset threshold $\theta 2$, the small base station is transformed to a remote radio head (RRH), other functions of the small base station including functions on a physical layer, a media access control (MAC) layer, and a radio resource control (RRC) layer are moved to a base station unit (BBU) pool, and the BBU pool is connected to the RRH through a fronthaul link;

in a case that the operating mode of the radio access network is a massive-connection low power mode, a clustering mechanism is adopted, and in the clustering mechanism, adjacent user terminals are formed into a mesh or tree-like topology cluster;

packet traffic generated by cluster members is delivered to a selected cluster head through device-to-device or multi-hop relay, the cluster head directly accesses the radio access network, wherein the cluster head is a user terminal, of which a number of connected user terminals is more than a preset threshold $\theta 3$, and the cluster members are user terminals in the cluster except the cluster head; and in a case that the operating mode of the radio access network is a low-latency high-reliability mode, a fog access point (F-AP), of which a transmission delay is less than a preset threshold $\theta 4$ is utilized, to enable user terminals to be connected to the radio access network with a multiple access method; or if a transmission delay between the F-AP and a target user terminal is greater than a preset threshold $\theta 4$, while a transmission delay between the target user terminal and its neighbor user terminal is less than the preset threshold $\theta 4$, the target user terminal accesses the neighbor user terminal with a device-to-device communication method.

4. The method according to claim 1, further comprising:

monitoring, by the central computing logic module, the measurement report data from all the user terminals in the radio access network, and checking whether an obtained quality of service and a number of active user terminals exceed respective preset thresholds, and if not, extending a duration of the cycle T1; otherwise shortening the duration of the cycle T1.

5. The method according to claim 3, wherein, according to the operating mode of the radio access network, determining, by the edge computing logic module, whether the configured edge communication entity meets the networking performance aim comprises:

during the cycle T2, monitoring, by the edge computing logic module, the performance of the edge communication entity and checking whether the variation of the performance indicator exceeds the preset threshold;

if the variation of the performance indicator exceeds the preset threshold, determining that the current configuration of the edge communication entity does not meet the networking performance aim, and that there is a need for the edge computing logic module to optimize the current configuration of the edge communication entity.

6. The method according to claim 5, wherein:

in the case that the operating mode of the radio access network is the wide-area seamless coverage mode, the edge computing logic module utilizes a deep reinforcement learning algorithm DRL1 to optimize the edge communication entity, where transmission power and a handover parameter of the macro base stations are optimized;

in the case that the operating mode of the radio access network is the hotspot high capacity mode, the edge computing logic module utilizes a deep reinforcement learning algorithm DRL2 to optimize the edge communication entity, where a number of activated small base stations or RRHs and update of cached content are optimized;

in the case that the operating mode of the radio access network is the massive-connection low power mode, the edge computing logic module utilizes a decision tree algorithm and a second machine learning algorithm to optimize the edge communication entity, where a decision tree model is trained to select the cluster head and the second machine learning algorithm is utilized to optimize routing from the cluster members to the cluster head;

in the case that the operating mode of the radio access network is the low-latency high-reliability mode, the edge computing logic module utilizes a deep Bayesian learning algorithm to optimize the edge communication entity, wherein according to historical information on an access node of a user terminal, a future access node selection of the user terminal is predicted, and mobility-related parameters of the access node are optimized; and the edge computing logic module checks whether the optimized edge communication entity meets the networking performance aim, and if the optimized edge communication entity meets the networking performance aim, the edge computing logic module allocates the resources to the user terminals connected to the edge communication entity, to network the edge communication entity and the user terminals that are allocated with the resources as an F-RAN, or otherwise, the edge computing logic module determines that there is a need to re-configure the operating mode to achieve the networking performance aim.

7. The method according to claim 1, wherein, according to the operating mode of the radio access network, the edge computing logic module, during the cycle T2, determines whether current configuration of the edge communication entity meets the networking performance aim, which further comprises:

if current resources allocated by the edge communication entity do not meet the networking performance aim, optimizing, by the edge computing logic module, allocation of the current resources to the configured edge communication entity during a cycle T3, where the cycle T3 is shorter than the cycle T2.

8. The method according to claim 7, wherein the edge computing logic module optimizing the allocation of the current resources during the cycle T3 comprises:

in a case that the operating mode of the radio access network is a wide-area seamless coverage mode, allocating, by the edge computing logic module during the cycle T3, the radio resources by using a deep reinforcement learning algorithm DRL3, wherein a reward function of the DRL3 is coverage of an access node, and a state of the DRL3 is interference distribution and a link status;

in a case that the operating mode of the radio access network is a hotspot high capacity mode, allocating, by the edge computing logic module during the cycle T3, the radio resources and the caching resources by using a deep reinforcement learning algorithm DRL4, wherein a reward function of the DRL4 is a weighted sum on an average throughput of the user terminals and an average capacity of access nodes, and a state of the DRL4 is the interference distribution and a cache status;

in a case that the operating mode of the radio access network is a massive-connection low power mode, allocating, by the edge computing logic module during the cycle T3, the radio resources and the computing resources by using a deep reinforcement learning algorithm DRL5, wherein a reward function of the DRL5 is a number of activated access nodes, and a state of the DRL5 is the interference distribution and available computing resources;

in a case that the operating mode of the radio access network is a low-latency high-reliability mode, allocating, by the edge computing logic module during the cycle T3, the radio resources and the caching resources by using a deep reinforcement learning algorithm DRL6, wherein a reward function of the DRL6 is a weighted sum on an average delay and a delay jitter duration, and a state of the DRL6 is the interference distribution and a cache status; and checking, by the edge computing logic module, whether optimized resource allocation meets the networking performance aim, and if the optimized resource allocation meets the networking performance aim, networking the edge communication entity and the user terminals that are allocated with resources as an F-RAN, or otherwise, determining that there is a need to re-optimize the configuration of the edge communication entity.

9. An artificial intelligence-based networking device, comprising:

a processor; and a memory storing a computer program which, when executed by a processor, causes the processor to perform the following steps:

receiving reported data which includes: measurement report data from user terminals, wireless transmission data from base stations, and operation and maintenance data from a radio access network, wherein the measurement report data relates to user behavior, the wireless transmission data relates to performance indicators of the radio access network, and the operation and maintenance data relates to service attributes;

based on the reported data obtained during a cycle T1 and a first machine learning algorithm, configuring an operating mode of the radio access network that matches the user behavior, the service attributes, and the performance indicators of the radio access network; and receiving information of the operating mode of the radio access network, and determining, according to the operating mode of the radio access network, during a cycle T2, whether a current configuration of an edge communication entity meets a networking performance aim which is that a variation of a performance indicator reading performance of edge communication entity does not exceed a preset threshold, wherein the cycle T2 is shorter than the cycle T1; wherein if the current configuration of the edge communication entity meets the networking performance aim, resources are allocated to the user terminals connected to the edge communication entity, to network the edge communication entity and the user terminals that are allocated with the resources as an F-RAN, wherein the resources comprise radio resources, computing resources, and caching resources.

10. The device according to claim 9, wherein determining, according to the operating mode of the radio access network, whether the configured edge communication entity meets the networking performance aim comprises:

during the cycle T2, monitoring the performance of the edge communication entity and checking whether the variation of the performance indicator exceeds the preset threshold; and if the variation of the performance indicator exceeds the preset threshold, determining that the current configuration of the edge communication entity does not meet the networking performance aim, and that there is a need to optimize the current configuration of the edge communication entity.

11. A non-transitory computer readable storage medium, storing a computer program which, when executed by a processor, causes the processor to perform the following steps:

receiving reported data which includes: measurement report data from user terminals, wireless transmission data from base stations, and operation and maintenance data from a radio access network, wherein the measurement report data relates to user behavior, the wireless transmission data relates to performance indicators of the radio access network, and the operation and maintenance data relates to service attributes;

configuring, based on the reported data obtained during a cycle T1 and a first machine learning algorithm, an operating mode of the radio access network that matches the user behavior, the service attributes, and the performance indicators of the radio access network;

receiving information of the operating mode of the radio access network, and determining, according to the operating mode of the radio access network, during a cycle T2, whether a current configuration of an edge communication entity meets a networking performance aim which is that a variation of a performance indicator regarding performance of the edge communication entity does not exceed a preset threshold, wherein the cycle T2 is shorter than the cycle T1; and if the current configuration of the edge communication entity meets the networking performance aim, allocating resources to the user terminals connected to the edge communication entity, to network the edge communication entity and the user terminals that are allocated with the resources as an F-RAN, wherein the resources comprise radio resources, computing resources, and caching resources.

* * * * *